Figure 1:
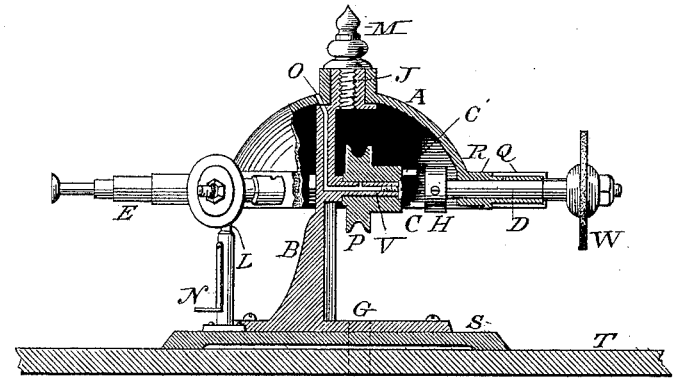

(No Model.)

N. W. HOLT.
DENTIST'S LATHE.

No. 399,406. Patented Mar. 12, 1889.

WITNESSES:

INVENTOR:

NEWTON W. HOLT, by Franklin Scott, Atty.

UNITED STATES PATENT OFFICE.

NEWTON W. HOLT, OF BENNINGTON, VERMONT.

DENTIST'S LATHE.

SPECIFICATION forming part of Letters Patent No. 399,406, dated March 12, 1889.

Application filed August 22, 1888. Serial No. 283,503. (No model.)

*To all whom it may concern:*

Be it known that I, NEWTON W. HOLT, of Bennington, county of Bennington, and State of Vermont, have invented certain Improvements in Dentists' Lathes, of which the following description, in connection with the accompanying single sheet of drawings, constitutes a specification.

My invention consists in certain improvements in rotating heads for dentists' lathes and in the appliances connected therewith for driving the radial spindles attached thereto, all of which is fully shown in the drawings accompanying this specification, wherein—

Figure 2:
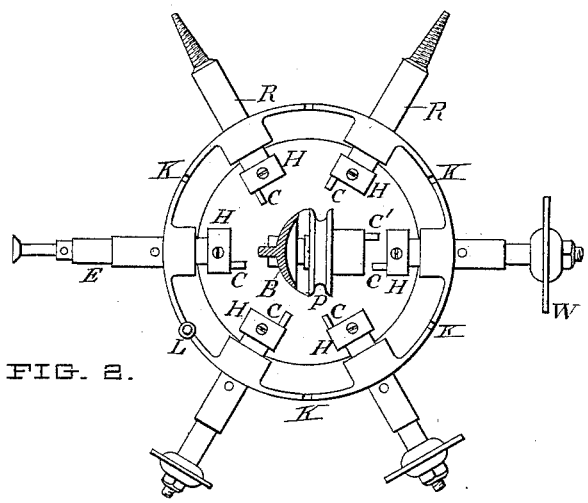

In Figure 1 I have shown a partial vertical section taken through the perpendicular axis of the machine, and in Fig. 2 is shown an inverted plan view of my improved rotating head.

My invention consists of a standard, B, erected on a base-plate, S, which is perforated, as at G, for the passage of the driving-belt. The top of standard B is turned up, so as to leave the stud J, upon which the dome-shaped shell A revolves. When in place, the shell is confined by the flanged screw-bolt M. The bottom rim of the dome A has a series of radial hubs, R R R, cast thereon, which are bored for the reception of spindles, as seen at D, Fig. 1. Each spindle carries a different kind of an implement—such, for instance, as circular brushes, emery-wheels, polishing-wheels, drills, &c. Upon the inner end of each spindle is the clutch-disk H, which carries a clutch-pin, C. The other member of the clutch consists of the pulley P, which revolves on a stud, V, which projects from standard B and is in line with the axis of spindle D. The hub of pulley P is provided with clutch-pin C', which is adapted to engage with pin C whenever the dome A is revolved, so as to bring a spindle in line with the axis of pulley P. The dome A has recesses K cut in its bottom edge at regular intervals, into which the spring-bolt L latches to hold the dome stationary.

The base-plate S may be screwed or fastened to any ordinary bench, table, or stand, and the pulley can be driven by a belt or cord from another pulley beneath.

I claim as my invention—

1. The horizontal circular lathe-head A, provided with radial spindles seated in radial bearings in the edge of the rim of the head, each carrying on its inner end one member of a clutch, in combination with a driving-pulley, and the other member of said clutch pivoted on the column upon which the head revolves, the spindles being arranged so that by revolving the head their axes may successively be brought into line with the axis of the driving-pulley, substantially as specified.

2. The combination of standard A, carrying clutch-pulley P, pivoted, as shown, with the revolving head A, carrying a series of radial spindles, each of which carries a clutch member to co-operate with the pulley-clutch, and the latch-bolt L, for locking the head in any desired position, substantially as shown, and for the purposes set forth.

In testimony whereof I have hereto subscribed my name, at Bennington, Vermont, this 23d day of July, A. D. 1888.

NEWTON W. HOLT.

In presence of—
 FRANKLIN SCOTT,
 E. H. WORTHINGTON.